April 28, 1964     K. E. KUNZE     3,131,249
STELLAR COMPASS
Filed Jan. 27, 1958     3 Sheets-Sheet 1
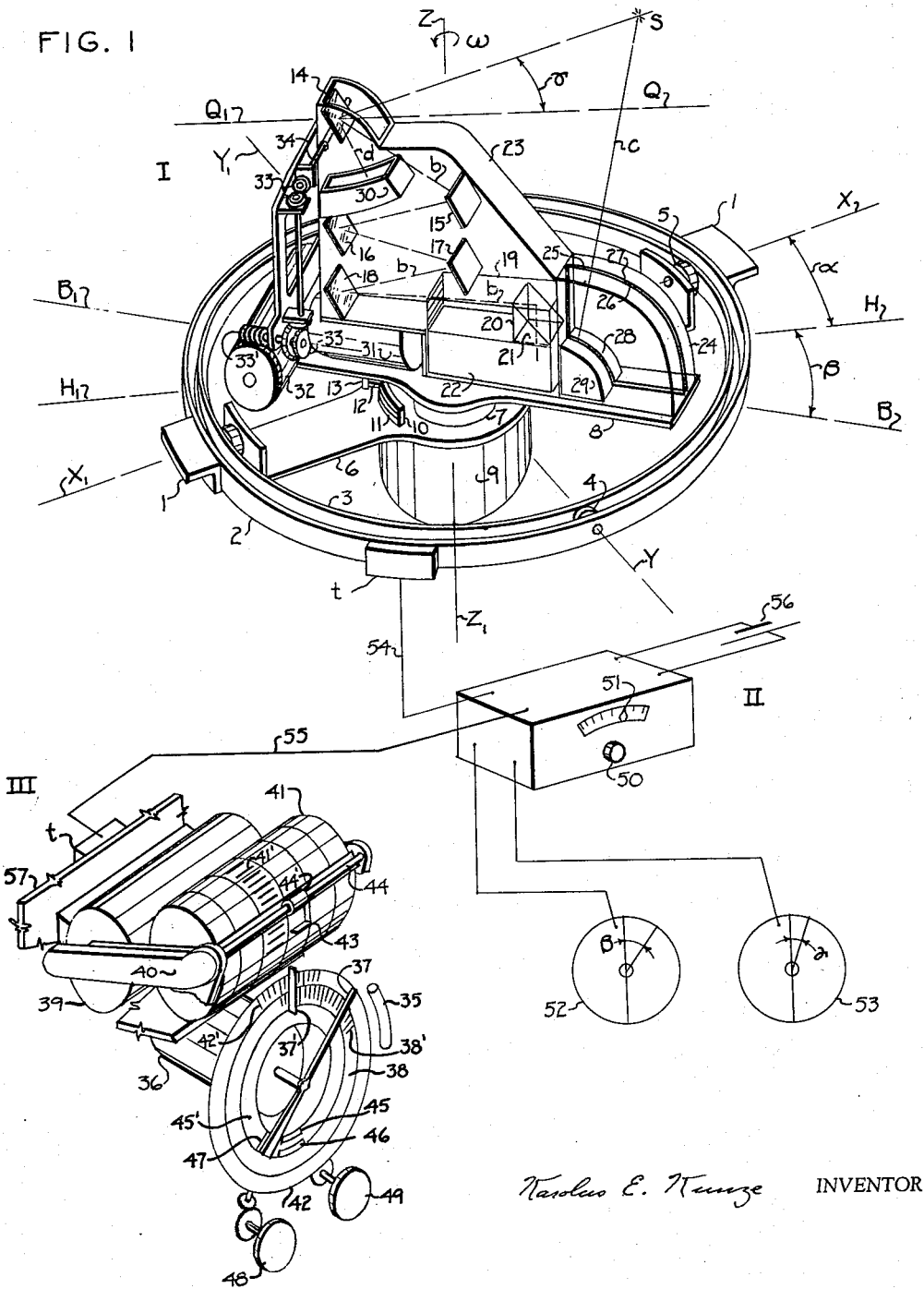
Karolus E. Kunze INVENTOR
BY
ATTORNEY April 28, 1964  K. E. KUNZE  3,131,249
STELLAR COMPASS
Filed Jan. 27, 1958  3 Sheets-Sheet 2
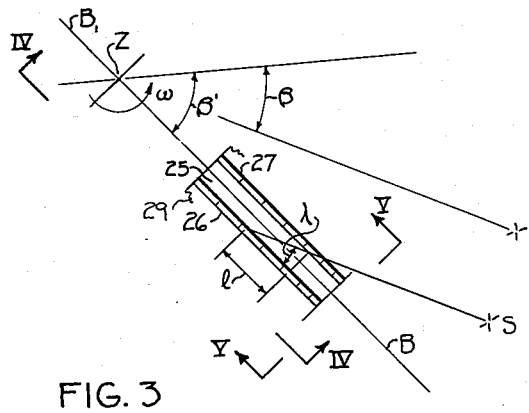
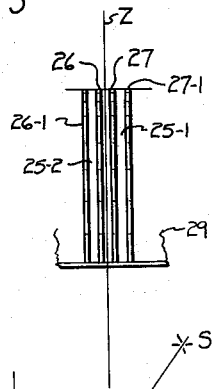
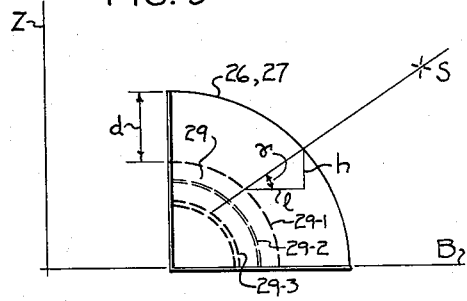
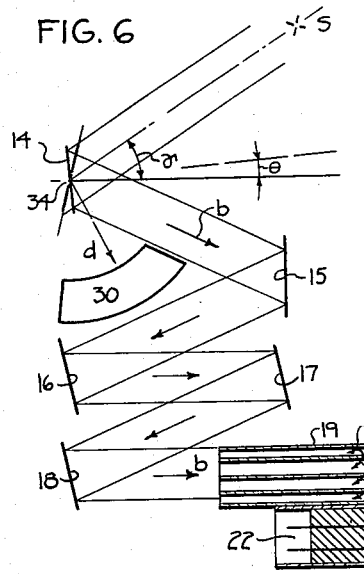
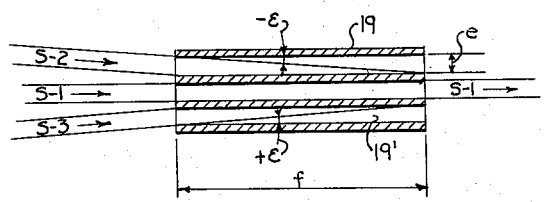
Karolus E. Kunze  INVENTOR
BY
ATTORNEY

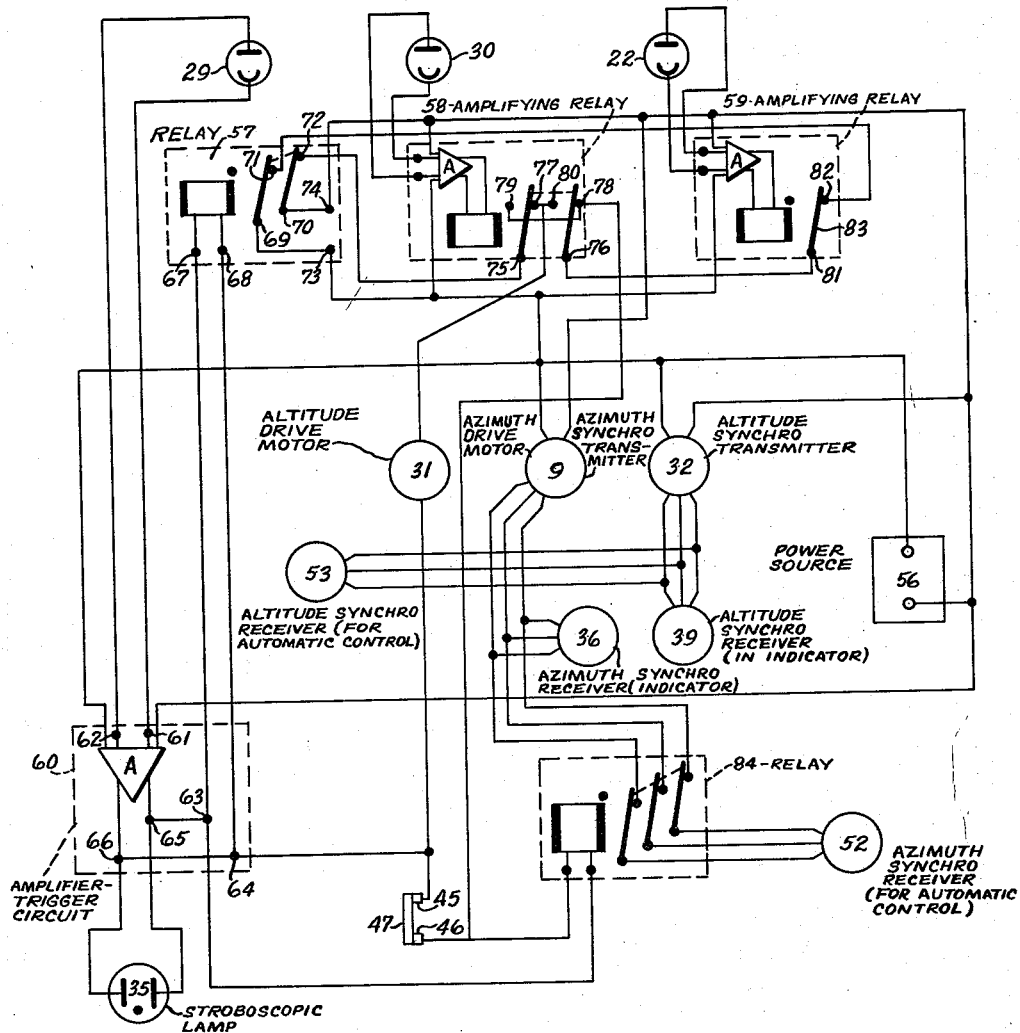

United States Patent Office 3,131,249
Patented Apr. 28, 1964

3,131,249
STELLAR COMPASS
Karolus E. Kunze, 120 Charles St., Annapolis, Md.
Filed Jan. 27, 1958, Ser. No. 711,354
5 Claims. (Cl. 88—1)

The invention comprises a combination of electromechanical and optical elements arranged to detect, evaluate and indicate the angular co-ordinates of one or more sources of radiant energy continuously and automatically.

The major object of the invention is the continuous presentation of the values of the angular co-ordinates just mentioned to the human or automatic pilot of any carrier navigable in general by the use of such co-ordinates, e.g. ships, aircraft or missiles.

A second object is the provision of the angular co-ordinates for use in grid navigation.

A third object is the provision of a steering indicator based on continuous automatic observations of celestial bodies.

Other objects and uses of the invention will become apparent as the description proceeds.

A form of the invention incorporating the major elements referred to above is described in the following and is illustrated by the accompanying drawings in which FIG. 1 is a schematic perspective of the entire apparatus; FIG. 2 is a partial plan view showing the horizontal sensing element; FIGS. 3 and 4 are the elevations IV—IV and V—V of FIG. 2; FIG. 5 is an elevation, similar to FIG. 4, of a modified element; FIG. 6 is a sectional elevation of the vertical sensing element; FIG. 7 is a vertical section of the grating; and FIG. 8 is a schematic wiring diagram of the entire combination.

For simplicity the "sources of radiant energy" will be considered light sources, as stars, and the "energy" itself will be considered as radiant energy in the visible spectrum or the infrared and will merely be called "light," although it is to be understood that this is not used in a manner which restricts the resultant instrument to operation within these wave lengths only.

With this understanding a form of the invention is shown as comprising three main units: I the primary unit, II the amplifier switching unit and III the indicating unit, all forming FIG. 1 of the drawing.

The geometric framework XYZ forms the basic reference. A star is located in this Cartesian framework by the angular co-ordinates $\gamma$ and $\beta$, $\gamma$ being the angle in a plane normal to the XY plane while $\beta$ lies in the XY plane. $H_1H$ is fixed to the carrier of the instrument and makes the angle $\alpha$, in the HXY plane with $X_1X$. $B_1B$ and $Q_1Q$ will be defined later.

A mechanical framework made up of gimbal rings 2 and 3 and foundation piece 6 is supported in the carrier of the instrument by the brackets 1 which are affixed to the ring 2. Bearings 4 and 5 allow piece 6 angular freedom about the axes $Y_1Y$ and $X_1X$. A bearing, 7, carried by piece 6 supports the scanning unit, mounted on bar 8, for rotation about the Z axis. Secured in fixed position on the under side of 6 is a motor, 9, arranged to drive the scanning unit in this rotation with the angular velocity $\omega$. It is apparent that this fixes $Z_1Z$ to the scanning unit and, therefore, the geometric framework is as described in the previous paragraph only when $Z_1Z$ is normal to the plane XHY. This condition will usually obtain and will be called the "normal" condition of the geometric framework. In this framework the scanning unit thus has three degrees of angular freedom, about the X, Y, and Z axes.

The scanning unit combines two optical pickups sensitive to light impulses from the source when the pick-ups are positioned proportionally to the two angular coordinates, and arranged for supervisory control of one pickup by the other. Specifically, the two pickups are shown by the elements 24 to 29, inclusive, and 14 to 22, inclusive. Both units are sensitive to components of light from the star S.

The pickup comprised by elements 24 to 29 hereinafter will be referred to as the "horizontal sensing element," while the combination 14 to 22 will be called the "vertical sensing element." In this usage "horizontal" and "vertical" are to be interpreted in the mutually relative sense only, i.e., without regard to the absolute or space orientation of the reference framework.

A second motor, 31, which may be a step-by-step mechanism, acts through gearing, 33, to rotate a spindle, 34, and a mirror, 14, mounted thereon for rotation about the axis of the spindle, which axis lies in a plane normal to $Z_1Z$. Mirror 14 forms the primary piece of the vertical sensing element. An opaque housing, 23, carries a mirror train, 15 to 18 inclusive, in fixed position such that a singular ray, $b$, from 14 will, alone, be transmitted through the train and through a grating, 19, to the prism, 20, and thence through a window, 21, into a light sensitive cell, 22. This is shown more clearly in FIG. 6 to which further reference will be had.

Also driven by the motor 31 through worm gearing, 33', is a synchro transmitter, 32.

The horizontal sensing element consists of the opaque case, 24, fitted with a deep slot, 25, formed by closely-placed plates, 26 and 27, which reach down to the surface 28 of a second light-sensitive cell, 29. The planes of the plates 26 and 27 are parallel to $Z_1Z$. A more detailed description of this arrangement is illustrated by FIGS. 2 to 5, inclusive. Referring to FIG. 2, a plan view, the line $B_1B$, fixed to the scanning unit, represents the trace of a plane containing $Z_1Z$, FIG. 1, and bisecting the slot 25. At the instant under consideration $B_1B$ has rotated to a position making the angle $\beta'$ with the line $H_1H$, a fixed line of the framework as noted previously, and at this instant the star S is located by the angular co-ordinates $\lambda$, $\gamma$, and $\delta$, in FIGS. 2, 3, and 4, respectively, relative to the boundaries of slot 25.

The curved line 29–1, FIG. 3, represents the lower edges of the slot forming plates 26 and 27. Below this line the slot opens out into the light-sensitive cell 29. Lines 29–3 and 29–2 represent, respectively, the curved cathode and anode of this cell. The ray from S within the slot has the components $h$, $l$, and $w$. When the resultant of these reaches from the rim to the bottom of the slot the light activates cell 29. Obviously this occurs for smaller values of $\lambda$ as the components $h$ and $l$ increase and the component $w$ decreases, i.e., as the slot is narrowed and deepened. Assuming all values fixed except $\lambda$, its value at the instant being considered will be called the "threshold" value. As the angular rotation $\omega$ continues, $\lambda$ decreases to zero at which time $\beta'$ reduces to $\beta$ and the slot centerline $B_1B$ points to the star. Further rotation increases $\lambda$ in the opposite direction until it again reaches a threshold value and the cell 29 is de-activated. During the sweep of the horizontal sensing element represented by this range of $\lambda$ between threshold values, the quantity of light falling on the cathode 29–3 varies between minima at the threshold values of $\lambda$ and a maximum for $\lambda$ equal to zero. The cell 29 will follow this light variation with cyclic responses having a maximum for $\lambda$ equal to zero with the line $B_1B$ positioned toward the star and located in the instrument framework by the angle $\beta$.

For increasing the total quantity of light incident upon the cathode of 29, and at the same time reducing the total value of twice the threshold angle $\lambda$, a multiplicity of slots are shown in FIG. 5. Here, three slots are shown;

namely, 25, 25–1, and 25–2, formed by plates 26, 27, 27–1, and 26–1.

The action of the horizontal sensing element may be summed up as follows: Once during each revolution of the primary unit about the Z axis the slot 25 crosses the plane containing the Z axis and the star. At the instant of this transit the slot admits maximum light to the light-sensitive cell 29 while less light is admitted to the cell as the slot approaches transit and immediately following transit. The range of motion during which appreciable light is admitted to the cell is defined by the angle $2\lambda$ and this value is made as small as required by decreasing the slot width, $\omega$, and increasing the depth, $d$, while the total quantity of light admitted is increased by increasing the number of slots. The resulting electrical response of the cell 29 takes the form of a series of impulses of frequency $\omega$ and having peak values at each instant of transit of the plane $Z_1SZ$ by the line B, B.

Refer to FIG. 8. The output of cell 29 is connected to the terminals 61 and 62 of an amplifier, 60. This amplifier contains a trigger circuit (omitted from the drawing for clarity) which is actuated by the peak amplified output of 29. A control knob, 50, and indicator, 51, are shown in II, FIG. 1. These are for the purpose of setting the energy level of the trigger point for controlling the selectivity of stars. The output of the trigger circuit is paralleled across the terminal pairs 63, 64 and 65, 66. The terminals 67 and 68 of a relay, 57, are connected internally to close the two-pole switch 69—72 when the trigger circuit fires. This energizes contacts 71 and 72 from the power source 56 through terminals 73 and 74 as shown. Simultaneously a stroboscopic lamp, 35, flashes. These events occur with a frequency $\omega$ and simultaneously with the transits of plane $Z_1SZ$ by the line $B_1B$, with the end B toward the star.

The motor 9 is connected as a self-synchronous transmitter to a receiver, 36, which, consequently, rotates the pointer, 37, of the indicating unit III, FIG. 1, in synchronism with the rotation of the scanning unit about Z. The stroboscopic lamp 35 (shown fragmentally as a ring in III, FIG. 1) is arranged to illuminate the indicator 37, a dial, 38, and an index, 37'. The zero of graduations 38', on dial 38, is marked by 37'. In I, FIG. 1, the line $B_1B$ is shown at transmit of the plane $Z_1SZ$, and the pointer 37 and index 37' are at this instant separated by the angle $\beta$, which is read on the graduations 38'. It is obvious that this indicator reading defines the horizontal angular co-ordinate of the star as the angle $\beta$ which refers the position to the line $H_1H$, I, FIG. 1. For convenience of reference this co-ordinate may be referred to the line $X_1X$ by the addition of the angle $\alpha$. This is done mechanically at the indicating unit by rotating outer dial, 42, by knob 49 until 37' reads the angle $\alpha$ against graduations 42'. The indicator 37 then reads the angle $\alpha+\beta$ against graduations 42' on the outer dial 42.

The net result of the foregoing is this: The horizontal angle between the vertical planes through the star S and through the line $X_1X$, i.e., the horizontal angular co-ordinate of S, is read directly by viewing the indicator 37 against graduations 42' which, being illuminated stroboscopically at a frequency $\omega$, appears to be stationary at the reading $\alpha+\beta$.

The action has been described for one star. However, any star of brightness great enough to place the amplified peak output of 29 above the setting of the trigger circuit (indicated by 51, II of FIG. 1) will cause the stroboscopic illumination of 37 in the manner just described. Hence a plurality of star co-ordinates may be indicated simultaneously. The several positions of 37 will then appear as though several stationary pointers are present, each indicating the horizontal angular co-ordinate of a star actuating 29.

Returning to the vertical sensing element, a vertical section of the optical-electronic portion is shown in FIG. 6. A ray from the star S is shown reflected as the ray $b$ from the primary mirror 14 through the train of fixed mirrors 15 to 18, inclusive; through the slots 19' of the grating 19 to the prism 20 and thence downward through the window 21 and onto the cathode, 22–2, of the light-sensitive cell 22. The anode of this cell is shown at 22–1. FIG. 7 shows a section of the grating 19. In this view S–1 represents a pencil of rays parallel to the slots, while S–2 and S–3 represent pencils of rays impinging on the grating entrance at the angles shown, i.e. $\mp\epsilon$ downward and upward. For S–1 the angle $\epsilon$ may be considered zero. Hence for angles of impingement between zero and $\epsilon$ light will traverse the grating, the quantity being a maximum for $\epsilon$ equal to zero and zero for the value $\epsilon$. It is the intent of the invention to keep the length, $f$, of the grating as great as possible and the slot depth, $e$, relatively small so the angle $\epsilon$ will be as close to zero as practicable. Within these limits, i.e., $+\epsilon$ to $-\epsilon$, there is only one, fixed direction for the ray $b$, as initially reflected from 14, which will allow the reflected beam to traverse the grid 19 and hence activation of the cell 22. Light following this ray will be called the "singular beam." For any vertical positon, $\gamma$, of the star there is, then, only one reflected beam which will actuate the cell and for this beam there is one angular position of the mirror 14, represented by $\theta$, the angle between a normal to mirror 14 and the line $Q_1Q$ which is fixed to the scanning unit and is perpendicular to $Z_1Z$. The rotation of mirror 14 is followed proportionally by the synchro transmitter 32. This is connected to a receiver, 39, of the indicator which, therefore, rotates proportionally to mirror 14. The synchro receiver motor 39 drives a drum indicator, 41, by gearing indicated by 40 and, simultaneously, a lead screw, 44, which moves the carriage screw, 44', carrying the index, 43. Graduations 41' are arranged helically on the drum 41. The purpose of this type of indicator is to allow the use of a long scale with consequently fine angular subdivisions. These divisions, read against index 43, are direct functions of the angle $\theta$. Since one value, only, of $\theta$ exists for each value of $\gamma$, the vertical angular co-ordinate of S, the divisions of scale 41' are marked directly in this angular co-ordinate, $\gamma$.

The action of the vertical scanning element is controlled by that of the horizontal scanning element in the following manner: In FIG. 8 assume the contacts 45 and 46 bridged by the bar 47. This unit will be referred to later. Assume also, that the reversing switch, 75—80 of a relay, 58, is closed with contacts 75, 77 and 76, 78 cooperating and let this position cause the direction of rotation of motor 31 to be such that the mirror, 14, FIG. 6, will be rotated counter-clockwise as seen in the drawing, i.e., the mirror will be elevated.

For locating the vertical position of the star the mirror 14 is rotated until the singular beam activates the cell 22. With cell 22 not activated the contacts 81 and 82, of a relay, 59, are closed. In relay 57 the switch 69—72 is closed by the trigger circuit at the instant of activation of cell 29 as previously mentioned. With this setting of relays the motor 31 will operate to elevate the mirror 14. However, the trigger circuit operates and hence, closure of switch 69—72 occurs, impulsively at a frequency $\omega$. Hence the operation of motor 31 and the consequent elevation of 14 will be in a series of incremental steps, one step per revolution of the scanning unit about $Z_1Z$. Due to the incremental nature of the motion the mirror will not usually overshoot or undershoot the singular position. When the reflected beam coincides with the singular position, the cell 22 is activated. Amplification, in 59, of the output of this cell causes bar 83 to open the circuit at contacts 81 and 82. This stops the motor 31 and the mirror 14 rests in the singular position, the particular value of which is then read as the vertical angular co-ordinate of the star on drum 41 of the indicator. This condition obtains momentarily, only, and will be disturbed by actual changes in the altitude of the star and by apparent changes in the altitude caused by oscillations of the instrument.

During this operation the reversing switch, 75–80 FIG. 8, has been considered closed for elevation of mirror 14. This occurs when the first reflected beam from 14 is below the singular position as shown by the dotted position of 14 and its reflected ray, d, FIG. 6. In this case the beam impinges upon and activates a third light-sensitive cell, 30, and it is the amplified output of this cell, acting in the relay 58 which closes the switch 75—80 in the previously assumed position. (The amplification of the output of 30 is assumed to take place within 58.) As the beam d moves up, the cell 30 remains activated until the singular position is reached at which time the cell is extinguished and the switch 75–80 is thrown to reverse (i.e., contacts 75, 79 and 76, 80 co-operating) the direction of rotation of the motor 31. The motor is inoperative at this time, however, because of the open circuit at 81, 82 under the action of the singular beam. If the star moves down relative to the instrument, the reflected ray from 14 is then above the singular position, contacts 81 and 82 are closed by 83 and the incremental motion of 14 is resumed, now downward, toward the singular position. The controlling action of cell 30 on switch 75—80 determines the direction of motion or motor 31 and mirror 14, this direction always being such that the first reflected beam from 14 moves toward the singular position, i.e., a slow, highly-damped, hunting motion is instituted.

In the event that more than one start is within the setting indicated by 51, FIG. 1, i.e., more than one stroboscopically-viewed position of pointer 37 occurs, the action of the cell 29 and switch 69—72 would cause the hunting motion of mirror 14 to be responsive to each star involved. In order to limit this motion to the tracking of one star, the contacts 45 and 46 are mounted on the annular ring 45' of the indicating unit III, FIG. 1. This ring may be rotated about the axis of pointer 37, by means of a knob, 48, to place the contacts 45, 46 in any circumferential position relative to the index 37'. Carried by the reverse end of the pointer 37 is a contact, 47, arranged for sliding contact across the faces of 45 and 46. That is, as the pointer revolves, the contacts 45 and 46 are short-circuited once per revolution by the contact 47. Referring to FIG. 8, it is seen that these contacts must be so short-circuited for motor 31 to operate. To select for vertical measurement a star whose horizontal position is indicated by 37, the ring 45' is rotated by knob 48 until the contacts 45 and 46 are positioned under the tail of the pointer 37. This causes the contacts to be short circuited, or closed, each revolution of 37 coincidentally with the instant of operation of cell 29 in transitting the Z₁SZ plane of that particular star, but at the transit of any other star the contacts are open and the vertical sensing element is therefore, inoperable. That is, the arrangement just described allows the choice, for the determination of the vertical angular co-ordinate, of any one star of those being indicated by limiting the supervisory control of the horizontal sensing element to the vertical motion associated only with the particular star chosen.

In FIGS. 1 and 8 two synchro motors, 52 and 53, are shown. In FIG. 8 it is seen that 52 is connected in parallel with 36 through a relay, 84, which is under control of the trigger circuit by connection to terminals 65 and 66 through contacts 45 and 46. Energization of the trigger circuit closes the contacts of relay 84, thus allowing synchro motor 52 to move toward the instep position with transmitter 9. Since the trigger circuit acts in the incremental manner previously described, the motor 52 will reach the in-step position by small increments of frequency ω, and responsive only to the star selected by contacts 45 and 46. The synchro receiver 53 is paralleled directly with the vertical indicating transmitter 39 and follows it in incremental motion. Receivers 52 and 53 are used to introduce the horizontal and vertical angular co-ordinates of the star, S (i.e., angles β and γ, respectively) into the servomechanisms of automatic control apparatus. Said automatic control apparatus is not shown since it is not part of the invention.

In FIGURE 1, the various amplifiers and relays shown in FIG. 8, i.e., 57, 58, 59, 60 and 84, are grouped and shown as the single amplifying-switching unit II. Connections between the scanning unit and the units II and III are made in the usual manner by means of such elements as the fragmentary-indicated brush holder 13 carried by bridge-piece 8 and holding brush 12 for co-operation with collector ring 11 on holder 10, mounted in turn on piece 6; flexible connectors in the vicinity of the gimbal bearings; the terminal blocks, t on ring 2 and case 57 of unit III; and cables 54 and 55. The source of power is shown at 56, FIG. 1 and FIG. 8.

No reference has, so far, been made to the absolute positioning of the geometric framework XYZ. The description has tacitly assumed a non-stabilized gravity suspension. In this case the words "vertical" and "horizontal" can be translated literally and the values of γ and β will be mean values over continuing short-time intervals. The instrument then acts in a statistical manner for the automatic and continuous evaluation of altitude and relative azimuth. However, the entire unit suspended by the gimbal ring 2 may be dynamically balanced about the origin of co-ordinates and the axes turned to any space position, for instance the position of equatorial mounting. To hold this stance the rotation ω may be stepped up to gyro magnitude and controls introduced but such arrangements are outside the scope of this specification and are referred to only as bearing on the usage of the instrument.

The action of the instrument has been described in detail in connection with the individual components but the general operation of the instrument is herewith presented for review:

The primary unit I, FIG. 1, is mounted in the carrier, in position to command a clear view in the case of light or infra-red reception, or in the position of most favorable reception for radiation of other frequencies. The axes are set as required. The indicating unit III is located in the position required, with unit II accessible for observing 51. The synchros 52 and 53 are mounted within the automatic control units. Power is connected in from an available source and rotation ω ensues. The magnitude of ω is not limited to any particular value but could be, for example, that which would present a continuous stroboscopic picture, e.g., 16 revolutions per second. Observation of the horizontal angular co-ordinates is made directly by reading pointer 37 against graduations 42'. Manipulation of knob 50 and indicator 51 will bring in the available stars or sources. One star is selected by knob 48 and thereafter its vertical angular co-ordinate will be read by observing index 43 against scale 41'. This co-ordinate will be fed into the automatic controls by synchro 53, while the horizontal angular co-ordinate of the same star will be introduced into the automatic controls by the synchro 52.

The instrument has been described in a particular manner but it is to be understood that alternatives of arrangement, design, and operation are available and for this reason the detailed description of this specification is to be in no way construed as limiting the scope of the invention.

I claim:

1. A stellar compass for continuous and simultaneous measurement of angular positions of a source of radiant energy, comprising in combination the following: first and second energy-sensitive scanning elements; a first rotational means for continuously rotating said scanning elements in a first predetermined plane; a second rotational means for intermittently rotating said second scanning element in a second predetermined plane not parallel to said first plane; means, actuated by energization of said first scanning element, for activating said second rotational means; means, actuated by energization of said second scanning element for de-activating said second rotational means; means for continuously and remotely indicating the angular positions of the first scanning element in the said first plane at each instant of its energization by said source and relative to a predetermined line in said plane; and means for continuously and remotely indicating the angular position of the second scanning element in the said second plane and relative to a predetermined line in said plane.

2. In a stellar compass the combination of first and second scanning elements sensitive to radiant energy within a predetermined band of wave lengths; a first rotating means for continuously turning said elements about a first predetermined axis; a second rotating means for intermittently turning said second scanning element about a second axis not parallel to said first axis; means actuated by energization of said first scanning element for activating said second rotational means; means actuated by energization of said second scanning element for deactivating said second rotational means; means adapted to indicate continuously and remotely the total rotation of said second scanning element relative to a predetermined line; and means actuated by peak energization of said first scanning element for instantaneuosly indicating the angular displacement of said first rotational means from a predetermined line.

3. In a stellar compass as described in the accompanying specification, a fixed mounting; a first support rotatable about a first axis relative to said mounting to sweep past one or more chosen sources of radiant energy; a second rotatable support mounted upon said first support for rotation relative to said first support but about a second axis not parallel to said first axis; first and second rotational means for rotating said first and second supports, respectively; a first energy sensing element mounted upon said first support for maximum response to each of said sources at the instant of transit of the plane containing the said first axis and the source; a second energy sensing element and having its scanning element mounted upon said second support for rotation therewith and for maximum response at the instant of alignment with said source due to rotation of the scanning element about both said first and said second axes; means responsive to said first sensing element for initiating rotation of said scanning element about said second axis by starting the second rotational means; means responsive to said second sensing element for halting its own rotation about the second axis by stopping said second rotational means; and means including synchro transmitters and receivers for reading the angular positions of said sensing elements relative to a coordinate system fixed to said fixed mounting, at any instant of maximum response of said sensing elements.

4. The stellar compass of claim 1 wherein the indicator comprises a case adapted for mounting separately from said sensing elements, a rotating pointer and means for mounting same for rotation in said case; a circular dial fixed to said case concentrically with said pointer and for indicating cooperation therewith; means for rotating said pointer around the face of said dial in synchronous rotation with said horizontal sensing element; a member mounted in said case for rotation around said dial concentrically with but independently of said pointer and means for manually rotating said member to any desired position around said dial; spaced electrical contacts mounted on said member and forming a gap in the power circuit of said means for rotating the vertical reflector; a short-circuiting bar adapted to rotate with said pointer for brushing engagement with said contacts once per revolution of the pointer; and whereby said means for intermittently rotating the vertical reflector can operate only when said bar is in engagement with and thereby short circuits said electrical contacts as said pointer and bar pass the dial positioned contacts and whereby said vertical reflector may be rotated only when said pointer and dial cooperate to indicate a chosen instantaneous angular position of said horizontal sensing element.

5. The stellar compass of claim 1 wherein the indicators showing the angular positions of the first and second scanning elements comprise the following: a case and bearings mounted therein; a pointer rotatable in said bearings; a first synchro receiver motor adapted to rotate said pointer in synchronism with said first sensitive element; graduated dials mounted in said case for cooperation with said pionter; a glow lamp for intermittently illuminating said pointer and graduated dials; means including an amplifier, a trigger circuit and means for adjusting the energy level or firing point of the trigger circuit, for operating said glow lamp at each occurence of maximum output of said first sensing element and whereby the pointer appears stationary against the graduated scales at the value of the first angular coordinate; a drum with helically arranged graduations marked thereon and mounted for rotation in said case; a lead screw and nut with attached indicator and gearing for driving same in correct relative motion; and a second synchro receiver motor adapted to drive said drum, lead screw and indicator nut through said gearing in proportion to the rotation of the primary reflector of said second sensing element and whereby said second angular coordinate is indicated by the position of the indicator nut relative to the graduations on said drum, this circuit indicator including a short-circuiting bar mounted on said pointer and cooperating with contacts carried by an annular ring adapted for various settings.

References Cited in the file of this patent

UNITED STATES PATENTS

| | | |
|---|---|---|
| 2,274,116 | Wright | Feb. 24, 1942 |
| 2,428,793 | Fay | Oct. 14, 1947 |
| 2,688,130 | Whitaker | Aug. 31, 1954 |
| 2,734,269 | Claret | Feb. 14, 1956 |
| 2,762,123 | Schultz | Sept. 11, 1956 |
| 2,855,523 | Berger | Oct. 7, 1958 |
| 2,923,202 | Trimble | Feb. 2, 1960 |
| 2,941,082 | Carbonara | June 14, 1960 |
| 3,004,162 | Menke | Oct. 10, 1961 |
| 3,010,102 | Ketchledge et al. | Nov. 21, 1961 |